Patented May 13, 1930

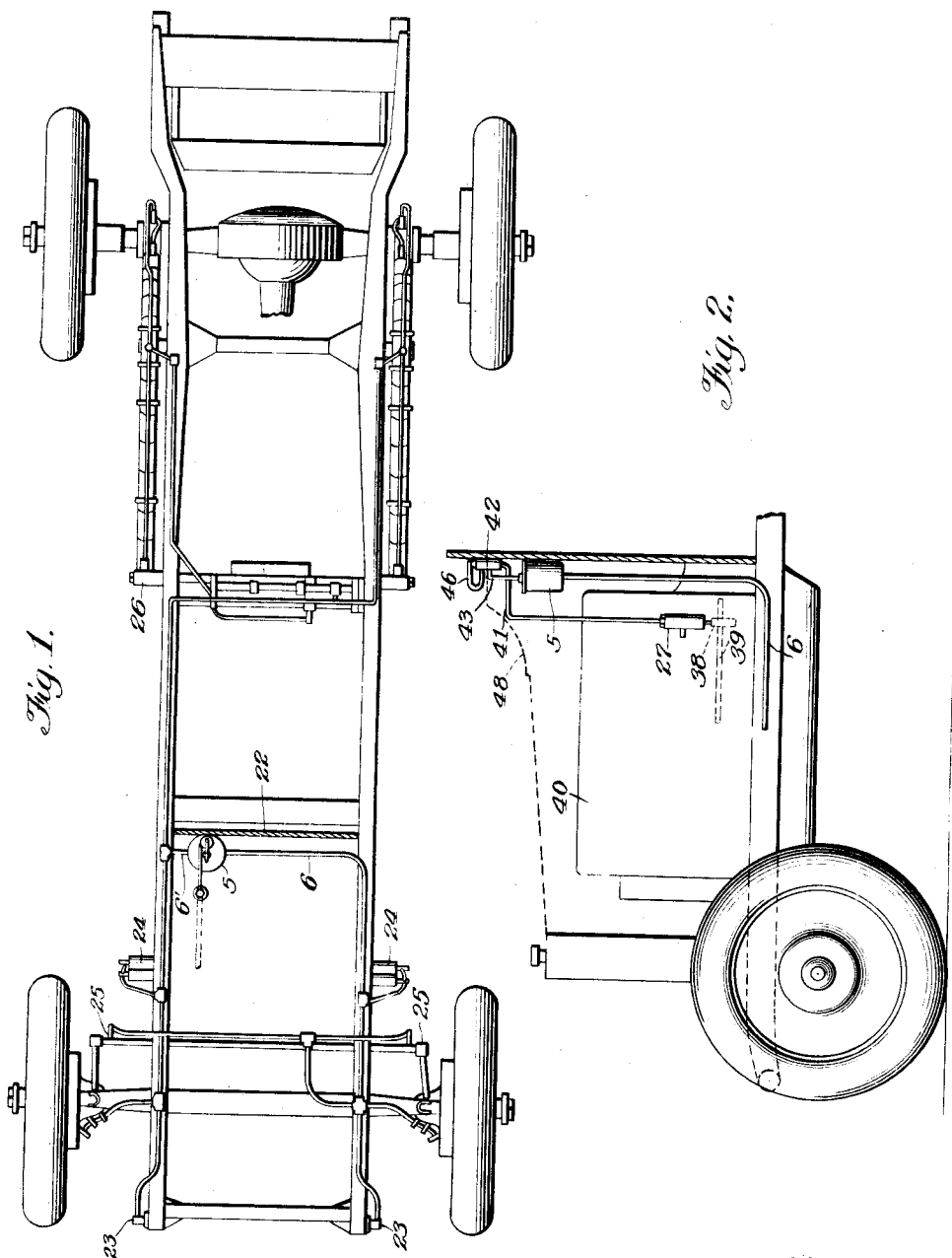

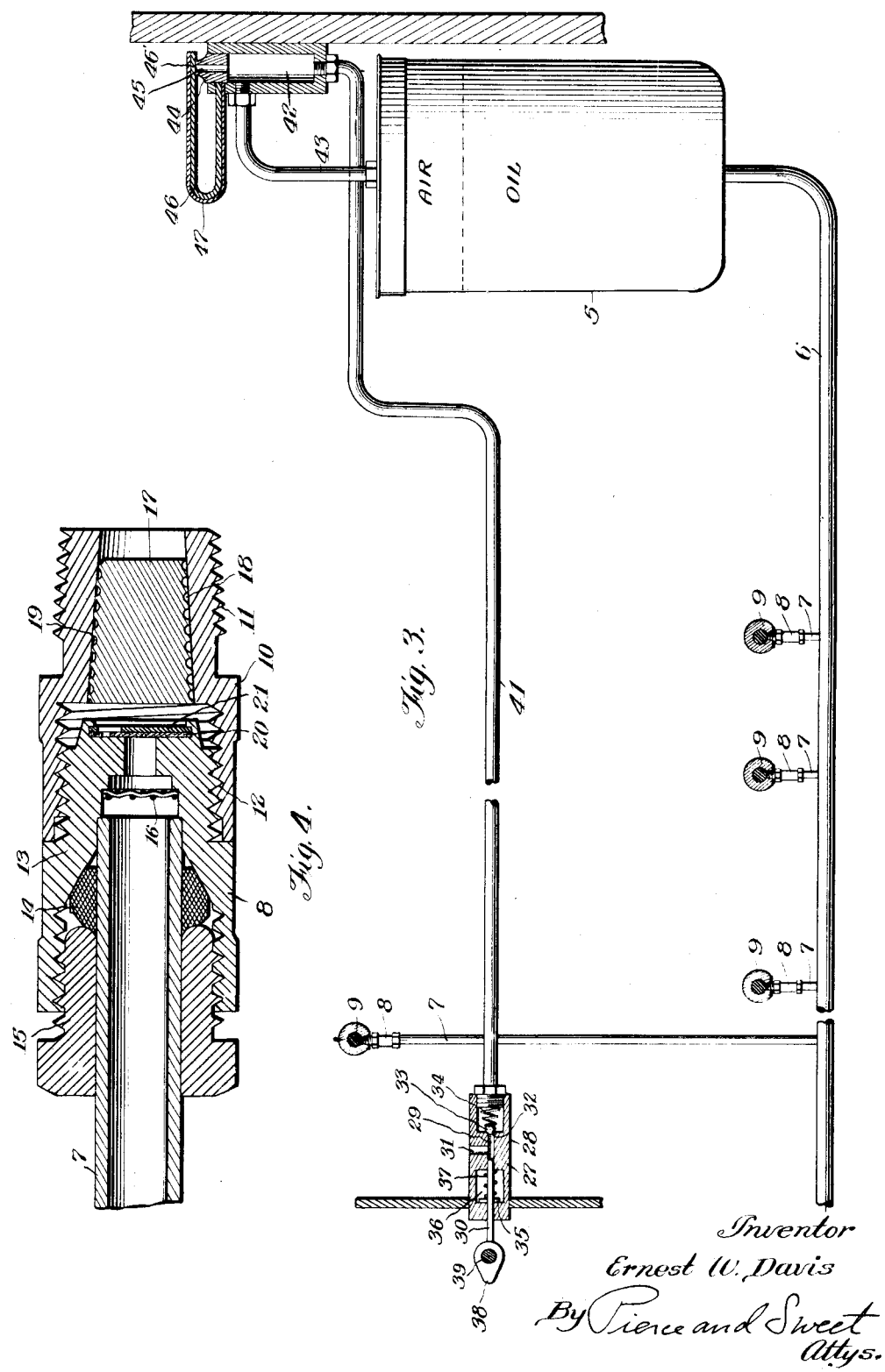

1,758,251

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed July 24, 1926. Serial No. 124,745.

My invention relates to improvements in lubricating systems and is particularly concerned, though not limited, to improvements in lubricating systems for lubricating the chassis bearings of automobile vehicles.

A number of lubricating systems for chassis lubrication have been devised, comprising a central source of lubricant and branched conduits leading from the source to the various bearings to be lubricated. Usually, some sort of apportioning means is provided between the ends of the branched conduits and the bearings to be supplied with lubricant so that the lubricant will be more or less approximately apportioned to the several bearings in accordance with their respective requirements. It has been found that if the pressure employed for forcing the lubricant through the several conduits and apportioning means is adjusted so that a satisfactory supply of oil to the bearings is effected in the summer time or hot months, as soon as the colder months are encountered, the supply of oil to the bearings is very materially decreased and this trouble becomes more pronounced as the temperature to which the system is subjected decreases. The explanation of this difficulty is simple and resides merely in the fact that as the temperature drops, or lowers, the viscosity of the oil increases and greater pressure is required for forcing a given amount of lubricant through the various bearings in a given time.

This difficulty is particularly noticeable and objectionable in systems in which the lubricant in the conduits is maintained under continuous pressures; in other words, in systems in which there is intended to be a continuous, definite supply of oil to the bearings. Such systems are necessarily so adjusted that the amount of lubricant delivered to any bearing during any definite period of time, say, for instance, while the car is traveling one hundred miles, is comparatively small, and if such a system is properly adjusted for the warmer months so that it will not supply an excessive amount of lubricant, it will utterly fail to supply the requisite amount during the colder months.

My present invention relates to systems such as described above, and particularly to systems in which, as stated, there is a continuous pressure, or substantially continuous pressure, upon the lubricant in the distributing pipes or conduits.

One of the objects of my invention is to provide a system, such as described, that comprises means for automatically varying the pressure on the lubricant with the changes in temperature, so that a proper supply of oil to the bearings will be effected irrespective of the temperatures to which the lubricating system is subjected.

Another object of my invention is to provide a system, such as described, that is automatic in its operation.

Another object of my invention is to provide a lubricating system having one or more of the characteristics described above, in which the pressure upon the lubricant is effected through a power transmission from the motor of the vehicle to the pressure exerting means.

A further object of my invention is to provide a system, such as last described, comprising means for effecting a substantially constant delivery of oil to the various bearings irrespective of the speed of the motor, other conditions remaining the same.

In addition, my invention contemplates the provision of a lubricating system, such as described, that is simple in construction, economical to manufacture and which will require a minimum amount of attention.

Other objects of my invention will appear as this description progresses, reference being had to the accompanying drawings, in which Figure 1 is a plan view of an automobile chassis equipped with my improved lubricating system;

Figure 2 is a side elevation of a portion of the construction shown in Figure 1;

Figure 3 is a schematic diagram showing certain details of construction and clearly disclosing the mode of operation of this system; and Figure 4 is an enlarged, longitudinal section through one of the apportioning devices.

My invention, in common with other systems of the character set forth herein, comprises a central source of lubricant, herein indicated as comprising the tank, or receptacle, 5, from which one or more conduits 6 conduct the oil to the various bearings to be lubricated. In most systems these conduits include branches 7 that terminate in apportioning devices 8 that are connected with the bearings 9.

In the present embodiment of my invention, I prefer to make use of an apportioning device having the construction and characteristics of that disclosed in Figure 4, which is fully disclosed and claimed in my co-pending application, Serial No. 74,424 filed December 9, 1925. This apportioning device, in general, comprises a suitable body member 10 externally threaded at 11 to enable it to be attached to a bearing to be lubricated, and internally threaded, as shown at 12, to receive the threaded nipple 13, by means of which the body member 10 is attached to one of the branch conduits 7. A suitable compression gasket 14 and follower 15 may be used for connecting the conduit 7 with the nipple 13. If desired, a filter 16 may be interposed at some point between the bearing and the source of supply.

A tapered resistance element 17, having a spiral groove 18 formed in its periphery, is forced into the tapered bore 19 of the body member 10 to provide a closed, spiral passageway of comparatively small cross section that offers considerable resistance to the flow of lubricant. I prefer to make the resistance of these elements considerably larger than the resistance of any one of the bearings to be supplied with lubricant so that the resistances of all of the bearings plus the resistance of the respective apportioning devices will be more or less equal.

I prefer to provide each apportioning device with a check valve for preventing siphoning of oil through the various branches of the distributing system. In this particular apportioning device, as set forth in my application above referred to, the check valve comprises a flat, fabric, flap check valve 20 that may, if desired, be somewhat reinforced by a flat metallic spring 21 tending to hold the flap valve closed.

The apportioning device described immediately above is only one of a number that may be used as a part of my system and no claim is made herein to the details of this apportioning device.

In applying the above described lubricating system to an automobile, the tank 5 may be mounted upon the partition 22 or dash between the body of the car and the hood compartment, and, as shown in Figure 1, the conduit 6 has several branches that lead to the front shackle bolts 23, rear shackles 24 of the front springs, tie rod bearings 25, front shackle bearings 26 of the rear springs, etc. The distributing conduit will, of course wherever necessary, include a section of flexible pipe in order to carry the oil from one part of the vehicle to a relatively movable part of the vehicle.

The system thus far described will function properly if the resistances are properly designed and the head of lubricant is sufficient to force the lubricant through the resistances and into the bearings. Where oil is used, as will practically always be the case in a lubricating system such as described herein, the pressure required during the hot months of the year will not be very large, and other conditions remaining constant, the system thus far described would function properly.

However, most automotive vehicles are used throughout the year and as the lubricating system described becomes subjected to colder conditions, the viscosity of the oil would very materially increase and the supply of oil to the bearings during any given period of time would be considerably less than what it had been during the warmer months.

My present invention provides means for compensating for this change in viscosity of the oil or lubricant. For this purpose I provide an air pump 27 that may be of any suitable design but which is here shown as comprising a body member 28 having a bore 29 of small diameter intermediate its ends, which bore forms a cylinder for the plunger 30. The inlet to the cylinder 29 is through the port 31 and the discharge port 32 of the pump is closed by any suitable check valve 33 held in place by the spring 34.

A pin 35 extends through the plunger 30 and, by engagement with the end of the bore 36 in the body member 28, provides a stop for limiting the outward movement of the plunger 30. A spring 37, confined between the pin 35 and the opposite end of the bore 36, provides means for returning the plunger 30 to the end of its intake stroke.

The plunger 30 may be driven by any suitable means that are here illustrated as comprising a cam 38 on the valve cam shaft 39 of the engine or motor 40.

From the description thus far made it will appear that as long as the motor is operating the pump 27 will continuously inject comparatively small quantities of air into the pipe 41 that leads to the pressure relief valve chamber 42. A pipe 43 leads from the chamber 42 into the top of the tank 5 so that as long as the air pump continues to operate, air under pressure will be confined in the top of the tank 5.

The receptacle 42 is provided at its upper end with a valve member 44 having the port 45 therethrough for establishing communication between the chamber 42 and the outer atmosphere. The valve for closing the port 45 is formed by the free end of the inner member 46 of a thermostatic element comprising the outer member 47, the two metals forming the elements 46 and 47 having such characteristics that as the temperature of the surrounding atmosphere decreases, the end portion 46' of the member 46 will press harder upon the end of the valve member 44, thereby necessitating a greater pressure in the chamber 42 to open the valve closing port 45 than is required under warmer conditions.

In the normal operation of my improved system the pump 27 would tend to supply a larger quantity of air to the tank 5 than is required to maintain the necessary pressure therein, and for that reason there is a substantially continuous, but small, discharge of air through the port 45 that tends to maintain the pressure of the air in the upper part of the tank 5 substantially constant with any given condition of temperature, but if the temperature decreases, the valve portion 46' of the thermostatic element will press harder on the seat surrounding the port 45 and the air pump will, therefore, have to produce a higher pressure in the valve chamber 42 and, consequently, in the tank 5, before any escape of air through the port 45 can take place.

If the temperature rises, the pressure of the valve member 46' upon its seat will be less than it was and, consequently, the pressure maintained in the chamber 42 and the upper part of the tank 5 will be less than it was before.

A system embodying the construction described above will function properly with oils that do not become plastic except at exceedingly low temperatures, and even though such an oil is used in the system described, the lubrication of the vehicle will, under ordinary circumstances, be satisfactory, because under such low conditions of temperature the oil, becoming plastic as it does and having substantially the characteristics of grease, does not flow out of the bearings, so that there is not the necessity of supplying lubricant in such large quantities as exists where the oil is fluid and can easily escape from the bearings. However, upon the return to the garage of a vehicle that has been subjected to such extremely low temperatures, there will still be pressure in the top of the receptacle 5 sufficient to force lubricant into the bearings just as soon as the viscosity of the lubricant in the distributing system and the bearings has been decreased, due to the higher temperature usually prevailing in a garage. This residual pressure will be sufficient to force a sufficient quantity of oil into the bearings to insure the proper lubrication thereof before the vehicle is again made use of.

In view of the fact that the air pump is driven from a shaft, or other moving part of the motor, the air pump is driven at a constantly varying speed, depending upon the speed of the vehicle. Without the provision of some means, such as a thermostat controlled valve for holding constant the pressure of the air in the receptacle 5, the varying pressure resulting from the variation in speed of the air pump would materially interfere with the proper function of the system, because the quantity of lubricant supplied to the bearings would then vary with the speed, which is not an altogether desirable condition.

I prefer to have the thermostatic control element subjected to substantially atmospheric temperature as distinguished from the temperature inside the engine hood, and have accordingly illustrated it as on the dash just above the cowl 48.

While I have described the details of construction of the preferred embodiment of my invention, it is to be clearly understood that my invention is not limited to these details but is capable of other adaptations and modifications within the scope of the appended claims. It will, for instance, be obvious that in case the design of the car body is such that the thermostatic element is unsightly in the location shown, it could equally well be placed in one of the channels of the frame, beside the conduit 6.

Having thus described my invention, what I claim is:

1. The combination with a vehicle comprising a chassis having bearings to be lubricated and a motor for driving said vehicle, of means for lubricating said chassis bearings, comprising a receptacle for holding the lubricant, conduits leading from said receptacle to the various bearings to be lubricated, apportioning devices connecting said conduit with said bearings, an air pump driven by said motor, a conduit for conducting air under pressure from said pump to said receptacle, and temperature responsive means for controlling the pressure of the air in said receptacle to maintain said pressure inversely proportional to the temperature to which said lubricating means is subjected.

2. The combination with a vehicle comprising a chassis having bearings to be lubricated and a motor for driving said vehicle, of means for lubricating said chassis bearings, comprising a receptacle for holding the lubricant, conduits leading from said receptacle to the various bearings to be lubricated, an air pump driven by said motor, a conduit for conducting air under pressure from said pump to said receptacle, and means for controlling the pressure of the air in said receptacle to maintain said pressure inversely proportional to the temperature to which said lubricating means is subjected.

3. The combination with a plurality of bearings to be lubricated, of a lubricating system therefor comprising a receptacle for holding the lubricant, conduits for conducting lubricant from said receptacle, apportioning devices for connecting said conduits with said bearings, an air pump for supplying air under pressure to said receptacle, a variable speed motor for driving said air pump, and temperature responsive means for controlling the pressure of the air in said receptacle to maintain said pressure inversely proportional to the temperature to which said lubricating system is subjected.

4. The combination with a plurality of bearings to be lubricated, of a lubricating system therefor comprising a receptacle for holding the lubricant, conduits for conducting lubricant from said receptacle, apportioning devices for connecting said conduits with said bearings, an air pump for supplying air under pressure to said receptacle, a motor for driving said air pump, and means for controlling the pressure of the air in said receptacle to maintain said pressure inversely proportional to the temperature to which said lubricating system is subjected.

5. The combination with a plurality of bearings to be lubricated, of a receptacle for holding the lubricant, conduits for conducting lubricant from said receptacle, apportioning means for connecting said conduits with said bearings, an air pump, means for driving said air pump, means for conducting air under pressure from said pump to said receptacle, and means for maintaining a substantially constant air pressure on the lubricant in said receptacle irrespective of the speed of said motor, other conditions remaining constant.

6. The combination with a plurality of bearings to be lubricated, of a lubricating system comprising a source of lubricant, conduits connecting said source and said bearings, means for developing pressure at the said source to force the lubricant to flow through said conduits to said bearings, and temperature sensitive control means for changing said pressure with changes in atmospheric temperature.

7. The combination with a plurality of bearings to be lubricated, of a lubricating system comprising a source of lubricant, conduits connecting said source and said bearings, means for developing pressure at the said source to force the lubricant to flow through said conduits to said bearings, and control means exposed to the outside air and sensitive to the temperature thereof for changing said pressure with changes in atmospheric temperature.

8. The combination with a vehicle comprising a chassis having bearings to be lubricated and a motor for driving said vehicle, of means for lubricating said chassis bearings comprising a source of lubricant, branched conduits leading to said bearings, apportioning means adjacent the individual bearings for regulating the quantity of lubricant supplied thereto, motor driven means for subjecting the lubricant in said conduits to pressure, and mechanism for maintaining said pressure substantially constant irrespective of the speed of said motor, other conditions remaining constant, said mechanism including temperature sensitive control means for changing said pressure with changes in temperature.

9. In a chassis lubricating system for automobiles, the combination of a source of lubricant supply, branched conduits connecting said source with a plurality of bearings to be lubricated, resistance units adjacent the individual bearings for apportioning the quantity of lubricant supplied thereto, automatic means for applying a uniform pressure to the lubricant in said conduits under conditions of uniform temperature, said pressure bearing a predetermined relationship to the resistance of said conduits and resistance units to insure proper lubrication of said bearings under said uniform temperature conditions, and an automatically operated temperature sensitive control element for varying said relationship proportionately to variations in temperature.

In witness whereof, I hereunto subscribe my name this 15th day of July, 1926.

ERNEST W. DAVIS.